United States Patent
Hammes et al.

[15] 3,652,290
[45] Mar. 28, 1972

[54] BEVERAGES CONTAINING STABILIZED VITAMIN C

[72] Inventors: Paul A. Hammes, Westfield; Lewis D. Morse, Princeton, both of N.J.

[73] Assignee: Merck & Co., Inc., Rahway, N.J.

[22] Filed: Aug. 10, 1970

[21] Appl. No.: 62,686

[52] U.S. Cl. .................................99/28, 99/11, 99/105, 99/155, 424/175, 424/273, 424/280, 424/295, 424/319
[51] Int. Cl. .............................................A23l 1/30
[58] Field of Search.................99/28, 11, 105, 140, 155, 54, 99/63, 78, 14, 150, DIG. 1; 424/280, 295, 319, 175, 273, 147, ; 260/343.7

[56] References Cited

UNITED STATES PATENTS

| | | | |
|---|---|---|---|
| 3,174,866 | 3/1965 | Saperstein | 99/54 |
| 2,694,719 | 11/1954 | Opplt | 99/155 X |
| 2,411,636 | 11/1946 | Preiswerk | 424/280 X |
| 2,374,407 | 4/1945 | Block et al. | 99/14 |
| 3,080,234 | 3/1963 | Jarowski | 99/14 |

OTHER PUBLICATIONS

Otani et al., Stabilization of Ascorbic Acid By Histidine, Chem. Abst., Vol. 36 p 5509, 1942
Esselen et al., Fortification of Fruit Juices With Ascorbic Acid, 9– 1946, Fruit Prod. Jour. and Amer. Food Mfg. Vol 26
Fukuda et al., Effect Of Food Additives On Stability Of Ascorbic Acid . . ., Chem Abst. Vol. 69, p 2423, 1968
Bunatyan, Oxidation and Stabilization of Vitamin C, Chem. Abst. Vol. 37, p 6714– 6715, 1943
Sinclair, The Orange, 1961, p 73, 80– 83, 241– 258

Primary Examiner—Joseph Scovronek
Assistant Examiner—Stephen B. Davis
Attorney—Raymond Underwood, Harry E. Westlake, Jr. and I. Louis Wolk

[57] ABSTRACT

Vitamin C is stabilized by the addition of 1 to 6 percent histidine or 0.4 to 3 percent glycine or 0.7 to 4 percent methionine based on the weight of the Vitamin C. The stabilized Vitamin C composition is used to fortify beverages. Metabolically available iron can be included within the stabilized Vitamin C composition.

9 Claims, No Drawings

BEVERAGES CONTAINING STABILIZED VITAMIN C

This invention relates to beverages which contain Vitamin C and particularly to a novel way of stabilizing this vitamin against deterioration. The invention is of especial value in protecting the Vitamin C against the destructive action of nutritionally assimilable iron if it is also present.

The beverage may be a natural or manufactured, fruit or vegetable drink containing Vitamin C. By a natural drink is meant the whole, concentrated or diluted juice from oranges, lemons, grapefruit, grapes, carrots, prunes, tomatoes and other produce which is squeezed or crushed to supply a beverage which naturally contains an appreciable amount of Vitamin C. It may be fortified with added Vitamin C and mixtures of different juices may be made. By a manufactured drink is meant one that is wholly or predominately flavored with a synthetic flavoring agent and to which Vitamin C has been added to supply all or nearly all of its Vitamin C content.

Of the several known vitamins, Vitamin C is recognized as a most important one as its inadequate consumption produces various human ills one of which is scurvy. As it is very water soluble it is readily excreted and consequently it is important that it be consumed every day. It is generally accepted that for adults the minimum daily intake is 30 mg. and the Recommended Daily Allowance is 60 mg.

Despite the human need for Vitamin C many persons are reported to be receiving an inadequate daily intake despite the fact that it is available in substantial amounts in many fruits and vegetables. To help satisfy a widespread need for Vitamin C, it has been added to the various beverages mentioned above and particularly to the packaged beverages sold in stores. However, the Vitamin C activity deteriorates in the package during storage and even after the package is opened and is awaiting complete consumption. For instance it has been considered advisable to add Vitamin C to packaged drinks wherein the flavor is mostly or all synthetic but it has been found that the other ingredients ordinarily present hasten Vitamin C deterioration.

Vitamin C is also known to have an adverse effect on ingredients which sometimes are added to the packaged beverage. An illustration of this is certain dyes which are added to give the beverage a more natural or a more attractive color. The chemical incompatability of the dye in the presence of the Vitamin C will cause the dye to fade during storage of the packaged beverage. The present invention includes as one of its features the discovery that by stabilizing the Vitamin C, its deteriorating action on the dye or other labile substance is overcome or minimized.

Mention has been made above of the fact that Vitamin C is stabilized by the present invention against the destructive action of iron in an elemental or compound form. This is important because there are an increasing number of reports of the widespread need for an added amount of daily intake of iron. One such recent report is entitled "Iron Deficiency in the United States" by the Committee on Iron Deficiency of the Council on Foods and Nutrition of the American Medical Association. The Recommended Daily Dietary Allowance of human adults is 10 to 18 milligrams.

It is apparent that if beverages and especially packaged beverages can be fortified with iron this would serve as an ideal medium to supply iron to children and adults. The present invention makes it possible to add iron to both natural and manufactured beverages, which naturally contain Vitamin C or which have been fortified with Vitamin C. For instance, ferrous sulfate could be added to freshly made orange or tomato juice as well as to their canned or frozen preparation. These preparations may be in their whole form or may be concentrated so that they are to be reconstituted with added water for consumption.

Our earlier filed patent application Ser. Nos. 858,892 and 50,911 both now abandoned disclose and claim and use of cysteine, in a carefully controlled amount relative to the Vitamin C and to the total volume of the packaged beverage, to overcome deterioration of the Vitamin C. As pointed out in them it was found that within this range the taste and the color of the beverage is not adversely affected. These applications also point out that although the protective effect of cysteine on Vitamin C had been investigated in the prior art, its actual, practical use had been dismissed because of its observed bad taste.

The present invention involves the use of histidine, glycine, or methionine to protect Vitamin C. Thus, these three amino acids have been found to each be a replacement for the cysteine in our earlier filed patent applications.

In applying the present invention to a manufactured beverage which is packaged it has been found that a preferred addition of Vitamin C to the drink in the single strength form, i.e., the dilution in which it is to be drunk, is 0.338 mg./ml. but it may be from 0.084 mg. to 0.675 mg. This is a Vitamin C concentration in the drink of 0.0084 percent to 0.0675 percent and preferably 0.0338 percent wt./vol. This concentration of Vitamin C is, as stated, based on the drink in its single strength form and it will provide a person with a considerable portion of the daily need for the vitamin. The invention may be applied equally as well as to concentrates, frozen or unfrozen, such as those which require dilution with water after the package is opened to obtain the single strength form. For instance, if the packaged concentrate is to be diluted with three volumes of water, i.e., the concentrate volume is one fourth of the intended dilution volume) the percent of Vitamin C would be four times higher in said concentrate.

If histidine is selected to practice the invention it preferably amounts to about 4.0 percent by weight of the Vitamin C but from 1.0 to 6.0 percent may be used. If glycine is selected to practice the invention it preferably amounts to about 1.5% by weight of the Vitamin C but from 0.4 to 3.0 percent may be used. If methionine is selected to practice the invention it preferably amounts to 3.0 percent by weight of the Vitamin C but from 0.7 to 4.0 percent may be used. If the HCl salts are used an additional amount must be added to obtain the equivalent amount of the amino acid base. This concentration of the amino acid in the drink is not noticeable or objectionable to the taste or smell. If more than 0.0675 percent Vitamin C is in the drink it will call for an amount of the amino acid in the lower part of the range so that an objectionable taste does not appear.

In practicing the invention as it relates to packaged beverages the Vitamin C and the selected one of the mentioned amino acids are mixed into the beverage before it is packaged. The package may be the conventional capped bottle or sealed metal container. On opening the container for consumption, the Vitamin C will assay approximately as high as when it was prepared and this will be true even if there is also present iron or iron compounds or other ingredients which generally tend to deteriorate the Vitamin C.

If iron is also to be present it may be added in its elemental form if it is used in an ultra fine powdered form and if it is kept in suspension preferably with a conventional suspending agent. As elemental iron it would constitute from zero up to three times the weight of the Vitamin C. Metabolically available iron compounds are preferable to the metalic iron and these may be the anhydrous or hydrated forms of ferrous-lactate, -fumerate, -gluconate, -succinate and -sulfate. Ferric compounds which may be used are ferric-chloride, -phosphate and -ammonium citrate. A sufficient weight of the selected iron compound would be used to supply an amount of iron ion within the range mentioned above.

If the whole, fresh juice is fortified with added Vitamin C the amount of amino acid added would be based on the resulting total Vitamin C. If the fresh juice is concentrated, irrespective of whether it is or is not frozen, the added amino acid would be based on the Vitamin C content as mentioned above. If iron is added to these natural juices its amount would constitute the same relationship to Vitamin C that is mentioned above, i.e., from zero to three times the weight of Vitamin C.

Representative examples are the following:

EXAMPLE 1

Bottles of the type used to package carbonated beverages (12 oz. capacity) were filled with 360 ml. of aqueous solution. The solution each contained 0.333 mg. Vitamin C/ml. and 3.25 mg. Citric acid/ml. Their contents varied in respect to ferrous sulfate content and amino acid content as shown in the accompanying table. All of the bottles had a head space of about 30 ml. air above the beverage. The bottles were sealed with traditional crimped caps. Initial determinations of Vitamin C were made within 3 hours of bottling. The head space was flushed with nitrogen after sampling; recapped, and stored in the dark at 38° C. Sampling at 1 week, 3 weeks and 7 weeks, the head spaces were flushed with nitrogen each time. Vitamin C determination are shown in the accompanying table as percent Vitamin C Recovered, based upon the original 0.333 mg./ml.

EXAMPLE I
(Example with histidine)

| Run No.: | $FeSO_4 \cdot 7H_2O$, mg./ml. | L-Histidine HCl, mg./ml. | Initial | Percent vitamin C recovered | | |
|---|---|---|---|---|---|---|
| | | | | 1 week | 3 weeks | 7 weeks |
| 1 | 0 | 0 | 89.8 | 75.6 | 57.9 | 49.0 |
| 2 | 0 | 0.01445 | 89.2 | 63.3 | 60.2 | 56.8 |
| 3 | 0 | 0.02890 | 89.2 | 64.1 | 58.7 | 56.1 |
| 4 | 0.0914 | 0.01445 | 78.4 | 67.1 | 60.2 | 52.2 |
| 5 | 0.0914 | 0.02890 | 96.8 | 67.9 | 64.9 | 62.2 |

EXAMPLE 2
(Example with glycine in place of histidine.)

| Run No.: | $FeSO_4 \cdot 7H_2O$, mg./ml. | Glycine HCl mg./ml. | Initial | Percent vitamin C recovered | | |
|---|---|---|---|---|---|---|
| | | | | 1 week | 3 weeks | 7 weeks |
| 1″ | 0 | 0 | 89.8 | 65.5 | 57.9 | 49.0 |
| 2″ | 0 | 0.00517 | 89.2 | 64.9 | 60.2 | 57.6 |
| 3″ | 0 | 0.01034 | 87.8 | 61.8 | 57.9 | 49.8 |
| 4″ | 0.0914 | 0.00517 | 79.3 | 66.4 | 61.0 | 57.6 |
| 5″ | 0.0914 | 0.01034 | 79.3 | 67.1 | 61.8 | 53.0 |

EXAMPLE 3
(Example with methionine in place of histidine.)

| Run No.: | $FeSO_4 \cdot 7H_2O$, mg./ml. | DL-Methionine HCl, mg./ml. | Initial | Percent vitamin C recovered | | |
|---|---|---|---|---|---|---|
| | | | | 1 week | 3 weeks | 7 weeks |
| 1‴ | 0 | 0 | 89.8 | 65.6 | 57.9 | 49.0 |
| 2‴ | 0 | 0.0102 | 94.2 | 70.9 | 65.6 | 61.4 |
| 3‴ | 0 | 0.0204 | 86.8 | 64.9 | 57.1 | 49.0 |
| 4‴ | 0.0914 | 0.0102 | 76.9 | 64.1 | 56.8 | 50.6 |
| 5‴ | 0.0914 | 0.0204 | 78.4 | 61.8 | 53.3 | 48.3 |

EXAMPLE 4

The above examples contain no flavoring agent other than the citric acid. A fruit flavored drink may be obtained by adding to a commercially available orange drink 0.333 mg. of ascorbic acid per ml. and also one of the above three amino acids within the range set forth for each. Iron may or may not be added, also within the range set forth above and preferably about 0.505 mg./ml. of ferrous sulfate heptahydrate. It should be pasturized and then rebottled or recanned.

EXAMPLE 5

Instead of the orange drink of Example 4, the drink may be a commercially made one or a freshly made one of orange, grape, lemon, cherry, pineapple, apple, cranberry or prunes, or a mixture of some of them. The drink may be made from reconstituted, frozen fruit juice to which additional Vitamin C may or may not be added; the amount of the selected amino acid would be based on the total Vitamin C content.

EXAMPLE 6

Instead of the fruit drinks of Examples 4 and 5, the drink may be a vegetable juice such as tomato, celery, carrot, beet, parsley, spinach, green pepper or a mixture of them.

EXAMPLE 7

Any one of the preparations of the above examples may have three-fourths of its water removed (or only one-fourth of the water added) so that a concentrate is packaged. This would be reconstituted with three volumes of water at the time of consumption. Or, a higher or lower relative concentrate may be packaged, which will require a measurable volume of restoration water.

EXAMPLE 8

To each ml. of freshly squeezed orange juice is added one of the three amino acids each within the range set forth. This will stabilize the Vitamin C which is naturally present and this is especially important if the orange juice is to be shipped to a distant point for consumption. As the orange juice contains about 0.50 mg. of ascorbic acid per ml., it may be fortified with added Vitamin C up to a total content of 0.675 mg. If iron is added it may constitute from 0 to 300 percent (as elemental iron) of the weight of the Vitamin C.

EXAMPLE 9

Instead of the orange juice of Example 8, any other whole fruit or vegetable juice or their palatable mixtures may be substituted.

The invention has been described above with special reference to the drinks which are to stand or be stored until consumed, but the invention includes as well a composition of Vitamin C, one of the three amino acids, with or without iron, which will be marketed to beverages producing companies so that the composition may be added to the water, flavors, etc., that make up the packaged beverage. The composition contains the following ingredients based on its addition to a ml. of the single strength drink.

EXAMPLE 10

| Vitamin C | 0.084 to 0.675 mg. preferably 0.338 mg. |
|---|---|
| Powdered elemental iron | 0–300% w/w of Vitamin C preferably 150% |

One of the following, w/w of Vitamin C:

| Histidine | Glycine | Methionine |
|---|---|---|
| 1.0–6.0% | 3.0% | 4.0% |
| preferably 4% | preferably 1.5% | preferably 3.0% |

For instance, a composition to be sold would contain, for addition to a ml. of the single strength drink, 0.338 mg. Vitamin C., 0.0145 mg. histidine hydrochloride and 0.338 mg. of powdered iron but other amounts within the stated ranges could be added or one of the other two amino acids could be substituted. To this composition could, of course, be added compatible coloring or flavoring agents for instance. If a metabolically available iron compound is used, an amount to yield the desired amount of elemental, or ferrous iron is added. To illustrate this as a packaged product to be sold, the following is an example:

EXAMPLE 11

| Ascorbic Acid | 1 kilo |
|---|---|
| Histidine HCl | 25 gm. |
| Elemental Iron | 1 kilo |

Example 11 shows that the HCl of histidine may be used and it or another physiologically acceptable salt may be used if the amount employed will yield the appropriate amount of the histidine base. Such a histidine salt may be used in any of the other examples. Instead of the iron, a metabolically available ferrous or ferric compound may be used, provided that the amount employed will yield the appropriate amount of the iron ion. These ferrous and ferric compounds and elemental iron are interchangeable in the other examples. These equivalent agents are intended to be included in the claims.

Some of the above examples describe partial or entirely synthetic drinks in which the color is due to a dye acceptable for food consumption. It has been stated above that the stabilization of the ascorbic acid according to this invention has the added benefit of protecting the dyes and maintaining the color of the beverage. Representative color agents which have been added to the above beverages and found to be unexpectedly stable are the following:

Orange color
   0.012 gm. Red No. 2
   0.149 gm. Yellow No. 5
   0.096 gm. Yellow No. 6
Purple color
   2.39 gm. Red No. 2
   0.106 gm. Blue No. 1
   0.106 gm. Yellow No. 5

A sufficient amount is added to the beverage to similate the desired natural grape juice color.

It is to be understood that in the above examples the amounts of Vitamin C, selected amino acid and iron can be varied within the ranges set forth above and in the claims.

Instead of using a single one of the amino acids, it is of course possible to combine two or more of them using a smaller amount of each so that the desired effect of one alone is obtained by the combination.

We claim:

1. A beverage containing a composition consisting of Vitamin C in the amount of 0.084 to 0.675 mg./ml. based on a single strength drink and as a stabilizing agent an amino acid selected from the group and respective range based on the Vitamin C by weight consisting of:

| histidine | and | methionine. |
|---|---|---|
| 1.0 to 6.0% | | 0.7 to 4.0% |

2. The beverage of claim 1 in which the histidine amounts to 4.0 percent of the Vitamin C.

3. The beverage of claim 1 in which the methionine amounts to 3.0 percent of the Vitamin C.

4. The beverage of claim 1 which is flavored with natural fruit juice.

5. The beverage of claim 1 which is flavored with natural vegetable juice.

6. The beverage of claim 1 which is flavored with an artificial agent.

7. The beverage of claim 1 which also contains metabolically available iron.

8. The beverage of claim 7 in which the stabilizing agent is a combination of said amino acids.

9. A composition of matter for fortifying a beverage consisting of Vitamin C and per kilogram of Vitamin C: 0 to 3 kilograms of metabolically available iron expressed as elemental iron, and as a stabilizing agent an amino acid selected from the group consisting of:

| histidine | and | methionine |
|---|---|---|
| 10 to 60 grams | | 7 to 40 grams. |

* * * * *

PO-1050
(5/69)

UNITED STATES PATENT OFFICE
CERTIFICATE OF CORRECTION

Patent No. 3,652,290      Dated March 28, 1972

Inventor(s) Hammes et al.

It is certified that error appears in the above-identified patent and that said Letters Patent are hereby corrected as shown below:

IN THE SPECIFICATION

Column 3 - Example 1

Run Number 1-- 1 week should be 65.6 instead of 75.6.

Column 3 - Example 2

In the Heading--should be L-Glycine instead of Glycine.

Column 3 - Example 3

Under Run Numbers--2'' should be 2'''.

Column 5 - Example 10

Under Glycine should be 0.4-3.0% instead of 3.0%.
    Under Methionine should be 0.7-4.0% instead of 4.0%.

Signed and sealed this 16th day of July 1974.

(SEAL)
Attest:

McCOY M. GIBSON, JR.
Attesting Officer

C. MARSHALL DANN
Commissioner of Patents